(12) United States Patent
Ubukata et al.

(10) Patent No.: US 11,613,671 B2
(45) Date of Patent: Mar. 28, 2023

(54) ANTI-SETTLING AGENT COMPOSITION FOR AQUEOUS PAINT

(71) Applicant: KUSUMOTO CHEMICALS, LTD., Tokyo (JP)

(72) Inventors: Makoto Ubukata, Saitama (JP); Hironori Nishiyama, Saitama (JP); Toshiki Saito, Saitama (JP)

(73) Assignee: KUSUMOTO CHEMICALS, LTD., Tokyo (JP)

(*) Notice: Subject to any disclaimer, the term of this patent is extended or adjusted under 35 U.S.C. 154(b) by 306 days.

(21) Appl. No.: 16/636,687

(22) PCT Filed: Oct. 19, 2018

(86) PCT No.: PCT/JP2018/039016
§ 371 (c)(1),
(2) Date: Feb. 5, 2020

(87) PCT Pub. No.: WO2019/078360
PCT Pub. Date: Apr. 25, 2019

(65) Prior Publication Data
US 2020/0165485 A1 May 28, 2020

(30) Foreign Application Priority Data
Oct. 20, 2017 (JP) .............................. JP2017-204061

(51) Int. Cl.
| | | |
|---|---|---|
| C09D 177/06 | (2006.01) | |
| C09D 7/45 | (2018.01) | |
| C08G 69/26 | (2006.01) | |
| C09D 5/02 | (2006.01) | |
| C08K 5/05 | (2006.01) | |
| C08K 5/053 | (2006.01) | |

(52) U.S. Cl.
CPC ............ *C09D 177/06* (2013.01); *C08G 69/26* (2013.01); *C08G 69/265* (2013.01); *C09D 5/02* (2013.01); *C09D 7/45* (2018.01); *C08K 5/05* (2013.01); *C08K 5/053* (2013.01)

(58) Field of Classification Search
CPC ................................ C09D 7/45; C09D 177/06
See application file for complete search history.

(56) References Cited

U.S. PATENT DOCUMENTS

| | | | |
|---|---|---|---|
| 5,994,494 A | 11/1999 | Wakui | |
| 8,809,429 B2 * | 8/2014 | Azeyanagi | ............... C09D 7/45 106/504 |
| 2012/0125235 A1 | 5/2012 | Azeyanagi et al. | |

FOREIGN PATENT DOCUMENTS

| | | |
|---|---|---|
| JP | 10-310726 | 11/1998 |
| JP | 2005-171155 | 6/2005 |
| JP | 2008-266448 | 11/2008 |
| JP | 2012-111832 | 6/2012 |

OTHER PUBLICATIONS

Machine translation of JP 2008-266448, Nov. 6, 2008.*
International Search Report dated Nov. 27, 2018 in International (PCT) Application No. PCT/JP2018/039016.

* cited by examiner

*Primary Examiner* — Vickey Nerangis
(74) *Attorney, Agent, or Firm* — Wenderoth, Lind & Ponack, L.L.P.

(57) ABSTRACT

An anti-settling agent composition for aqueous coating materials, comprising [A] a polyamide which is obtained by polymerizing a diamine having 2-12 carbon atoms and an excess amount, relative to diamine, of either a dicarboxylic acid having 4-36 carbon atoms or a mixture of a dicarboxylic acid having 4-36 carbon atoms and a monocarboxylic acid having 2-22 carbon atoms, and [B] a hydrophobic organic compound which is a hydrocarbon modified with 1-3 hydroxyl groups and/or carboxyl groups and having 10-54 carbon atoms, and which has a freezing point of 20° C. or less or does not have a definite freezing point. The anti-settling agent is able to be easily dispersed in a coating material even if directly added into the coating material without being diluted when added into the coating material, and which imparts the coating material with excellent anti-settling properties.

10 Claims, No Drawings

ANTI-SETTLING AGENT COMPOSITION FOR AQUEOUS PAINT

TECHNOLOGICAL FIELD

This invention relates to an anti-settling agent composition for aqueous paint.

BACKGROUND ART

Since aqueous paint has less impact on environment and workers than solvent-based paint does, aqueous paint has recently come to attain an increasingly large proportion in various fields such as automotive paint. In parallel with the increase of aqueous paint, there has naturally been a growing demand for water-based anti-settling agent for aqueous paint. As anti-settling agent for aqueous paint, there are used anti-settling agent which mainly comprises polyamide (Official Gazette of U.S. Pat. No. 3,564,259 and Official Gazette of U.S. Pat. No. 5,582,983), anti-settling agent which comprises a mixture of polyamide and different kinds of polymer (Official Gazette of U.S. Pat. No. 4,546,725 and Official Gazette of U.S. Pat. No. 4,567,705), etc.

Generally, in the case of an anti-settling agent which mainly comprises polyamide, the higher the content of polyamide in the anti-settling agent is, or the stronger the cohesive force of polyamide used is, the anti-settling agent tends to show the better anti-settling properties, but remarkably decreases in dispersibility in paint. For this reason, it is necessary to first dilute an anti-settling agent with a medium such as water, solvent and resin to prepare a preliminary dispersion, and to then add the same to paint. This additional step of preparing a preliminary dispersion is however economically disadvantageous, which problem was yet to be addressed.

Due to its strong cohesive force, polyamide has low compatibility with heterogeneous materials. For instance, a mixture of polyamide and different kinds of polymer such as ester-based polymer and acrylic polymer is susceptible to separation of components of anti-settling agent, resulting in the possible formation of poorly dispersed matters in the paint. Thus, an anti-settling agent which is made from such a mixture as mentioned above had a problem to be solved in terms of dispersibility in paint.

SUMMARY OF INVENTION

Technical Problem

Under the above-mentioned circumstances, the objective of this invention is to provide an anti-settling agent composition for aqueous paint which is dispersible without a dilution step for the sake of easy addition to paint, even when the polyamide used has a strong cohesive force or when the paint has a high content of polyamide.

Solution to Problem

As a result of assiduous researches to solve the above-mentioned problems, the inventors of this invention have found out that the above-mentioned objective can be achieved by blending, with a polyamide-type water-based anti-settling agent, a certain amount of hydrophobic organic compound which has either a low freezing point (at most 20° C.) or shows no definite freezing point, and which is well compatible with polyamide. The inventors of this invention have thus completed this invention.

This invention provides anti-settling agent compositions for aqueous paint as follows.

(1) An anti-settling agent composition for aqueous paint which comprises [A] a polyamide which has been prepared by polymerization between a diamine having 2 to 12 carbon atoms and an excess amount, relative to diamine, of either a dicarboxylic acid having 4 to 36 carbon atoms or a mixture of a dicarboxylic acid having 4 to 36 carbon atoms and a monocarboxylic acid having 2 to 22 carbon atoms, and [B] a hydrophobic organic compound which is a hydrocarbon having 10 to 54 carbon atoms which has been modified with one to three hydroxyl and/or carboxyl groups, that has either a freezing point of at most 20° C. or shows no definite freezing point.

(2) The anti-settling agent composition for aqueous paint of the above (1) wherein the dicarboxylic acid which constitutes the above [A] is either a non-straight chain dicarboxylic acid having 36 carbon atoms or a mixture of 75 weight % or more of a non-straight chain dicarboxylic acid having 36 carbon atoms and 25 weight % or less of straight chain dicarboxylic acid having 4 to 12 carbon atoms.

(3) The anti-settling agent composition for aqueous paint of the above (1) or (2) wherein the above [A] has an acid value of 30 to 130 mgKOH/g.

(4) The anti-settling agent composition for aqueous paint of any of the above (1), (2) or (3) wherein the above [B] comprises at least one species of compound which is selected from the group consisting of an aliphatic monoalcohol compound having 18 carbon atoms, aliphatic monocarboxylic acid compound having 10 to 18 carbon atoms, a dialcohol compound having 36 carbon atoms, a dicarboxylic acid compound having 36 to 44 carbon atoms and a tricarboxylic acid compound having 54 carbon atoms.

(5) The anti-settling agent composition for aqueous paint of any of the above (1) to (4) wherein the weight ratio of the above [A] to the above [B] ranges from 95:5 to 60:40.

(6) An aqueous paint composition which comprises an anti-settling agent composition and an aqueous paint wherein the anti-settling agent composition comprises [A] a polyamide which has been prepared by polymerization between a diamine having 2 to 12 carbon atoms and an excess amount, relative to diamine, of either a dicarboxylic acid having 4 to 36 carbon atoms or a mixture of a dicarboxylic acid having 4 to 36 carbon atoms and a monocarboxylic acid having 2 to 22 carbon atoms, and [B] a hydrophobic organic compound which is a hydrocarbon having 10 to 54 carbon atoms which has been modified with one to three hydroxyl and/or carboxyl groups, that has either a freezing point of at most 20° C. or shows no definite freezing point.

(7) An article which has been coated with the aqueous paint composition of the above (6).

Advantageous Effects of Invention

The anti-settling agent composition for aqueous paint of this invention, even when the same has been made from polyamide having a strong cohesive force or when made from a high content of polyamide, is not only capable of being directly added to paint without a dilution step for the sake of improvement of dispersibility in paint, but also capable of giving good anti-settling properties to paint.

DESCRIPTION OF EMBODIMENTS

Details of this invention are explained below.
Anti-Settling Agent Composition for Aqueous Paint
The anti-settling agent composition for aqueous paint of this invention (hereinafter referred to as "the composition of this invention") comprises [A] a polyamide which has been prepared by polymerization between a diamine having 2 to 12 carbon atoms and an excess amount, relative to diamine, of either a dicarboxylic acid having 4 to 36 carbon atoms or a mixture of a dicarboxylic acid having 4 to 36 carbon atoms and a monocarboxylic acid having 2 to 22 carbon atoms, and [B] a hydrophobic organic compound which is a hydrocarbon having 10 to 54 carbon atoms which has been modified with one to three hydroxyl and/or carboxyl groups, that has either a freezing point of at most 20° C. or shows no definite freezing point. Due to the excess amount of dicarboxylic acid relative to diamine, thus synthesized polyamide has, in its structure, carboxylic acid at molecular terminal.

Component [A] Polyamide

The polyamide [A] (hereinafter referred to as "component [A]") which is used in the composition of this invention is a polyamide which has been prepared by a reaction between a diamine having 2 to 12 carbon atoms and an excess amount, relative to diamine, of either a dicarboxylic acid having 4 to 36 carbon atoms or a mixture of a dicarboxylic acid having 4 to 36 carbon atoms and a monocarboxylic acid having 2 to 22 carbon atoms.

Examples of diamine having 2 to 12 carbon atoms which is used for the synthesis of component [A] include ethylene diamine, 1,4-diaminobutane, hexamethylene diamine, methaxylylene diamine, isophorone diamine, 1,8-octamethylene diamine, 1,10-decamethylene diamine, 1,11-undecamethylene diamine, 1,12-dodecamethylene diamine, or the like. These may be used either singly or in combination.

Examples of dicarboxylic acid having 4 to 36 carbon atoms which is used for the synthesis of component [A] include succinic acid, glutaric acid, adipic acid, pimelic acid, suberic acid, azelaic acid, sebacic acid, dodecanedioic acid, isophthalic acid, dimer acid, or the like. These may be used either singly or in combination.

The above-mentioned dimer acid which is used for the synthesis of component [A] is an aliphatic acid which is mainly composed of a non-straight chain dicarboxylic acid having 36 carbon atoms, that is prepared by the dimerization of unsaturated aliphatic acid. For this dimer acid, those which are found on the market are available. Examples of dimer acid which is used for the synthesis of component [A] include Pripol 1013 and Pripol 1017 manufactured by Croda Japan KK, HARIDIMER 200, HARIDIMER 250 and HARIDIMER 270S made by Harima Chemicals Co., Ltd., Tsunodime 205, Tsunodime 206 and Tsunodime 228 made by Tsuno Co. Ltd., or the like. Dimer acid on the market contains monomer acid or trimer acid as well as dimer acid. Those which have a high content of dimer acid are preferably used.

Examples of monocarboxylic acid having 2 to 22 carbon atoms which is used for the synthesis of component [A] include acetic acid, propionic acid, butyric acid, valeric acid, caproic acid, enanthic acid, caprylic acid, pelargonic acid, capric acid, lauric acid, myristic acid, palmitic acid, stearic acid, 12-hydroxystearic acid, oleic acid, behenic acid, etc. These may be used either singly or in combination.

The dicarboxylic acid which constitutes component [A] is either a non-straight chain dicarboxylic acid having 36 carbon atoms or may be a mixture of 75 weight % or more of a non-straight chain dicarboxylic acid having 36 carbon atoms and 25 weight % or less of straight chain dicarboxylic acid having 4 to 12 carbon atoms. The higher the content of straight chain dicarboxylic acid is in all the dicarboxylic acids which constitute component [A], the stronger becomes the cohesive force of component [A], and, so, anti-settling properties are bettered. When, however, the content of straight chain dicarboxylic acid exceeds 25 mole %, the cohesive force of component [A] becomes too strong, and, so, dispersibility remarkably decreases, and also anti-settling properties are weakened. Or the dicarboxylic acid which constitutes component [A] is either a non-straight chain dicarboxylic acid having 36 carbon atoms or may be a mixture of 75 mole % or more of a non-straight chain dicarboxylic acid having 36 carbon atoms and 25 mole % or less of straight chain dicarboxylic acid having 4 to 12 carbon atoms.

Anyone skilled in the art would know well how to conduct polymerization between a diamine having 2 to 12 carbon atoms and an excess amount, relative to diamine, of either a dicarboxylic acid having 4 to 36 carbon atoms or a mixture of a dicarboxylic acid having 4 to 36 carbon atoms and a monocarboxylic acid having 2 to 22 carbon atoms, with a view to synthesizing component [A] for this invention. For instance, diamine and dicarboxylic acid may be polymerized for two to 10 hours at temperature of 150 to 200° C. In that case, a dehydration aid such as xylene may be used where necessary.

Component [A] has an acid value in the range of 30 to 130 mgKOH/g. When the acid value is less than 30 mgKOH/g, the viscosity of polyamide dispersion so remarkably increases for the production of anti-settling agent composition that it becomes hard to produce an anti-settling agent composition. When the acid value is larger than 130 mgKOH/g, the paint to which an anti-settling agent composition has been added is liable to show spinnability. Incidentally, acid value can be measured on the basis of JIS K 0070-1992 "Test methods for acid value, saponification value, ester value, iodine value, hydroxyl value and unsaponifiable matter of chemical products".

Component [B] Hydrophobic Organic Compound

The hydrophobic organic compound [B] (hereinafter referred to as "component [B]") which is used in the composition of this invention is a hydrophobic organic compound which is a hydrocarbon having 10 to 54 carbon atoms which has been modified with one to three hydroxyl and/or carboxyl groups, that has either a freezing point of at most 20° C. or shows no definite freezing point. Freezing point can be measured on the basis of JIS K 0065-1992 "Test method for freezing point of chemical products". Or a freezing point tester on the market may be available. The term "shows no definite freezing point" as mentioned in the present specification means that the compound is a liquid which has fluidity at temperature of 20° C. or higher, and a sample of which shows no definite crystallization when visually observed during measurement by the above-mentioned test method for freezing point. These properties are seen in dimer acid which is prepared by the dimerization of unsaturated aliphatic acid, trimer acid which is prepared by the trimerization of unsaturated aliphatic acid, or in dimer diol which is prepared by the reduction of dimer acid. Since it is hard to measure the freezing point in these cases, the present specification indicates "no definite freezing point shown" or "no freezing point".

Examples of component [B] include unsaturated long chain aliphatic acids such as oleic acid (freezing point: at most 9° C.); branched long chain aliphatic acids such as FINEOXOCOL ISOSTEARIC ACID (isostearic acid; freezing point: at most −30° C.), FINEOXOCOL ISOSTEARIC ACID N (isostearic acid; freezing point: at most −30° C.), FINEOXOCOL ISOSTEARIC ACID T (isostearic acid; freezing point: at most −10° C.), FINEOXOCOL ISOPALMITIC ACID K (isopalmitic acid; freezing point: −3° C.) and FINEOXOCOL ISOARACHIC ACID (isoarachic acid; freezing point: at most −30° C.) manufactured by Nissan Chemical Corporation, and VERSATIC 10 (neodecanoic acid; freezing point: at most −30° C.) manufactured by Hexion Specialty Chemicals, Inc.; dimer acids which are prepared by the dimerization of unsaturated aliphatic acid such as Pripol 1017 (dimer acid having 36 carbon atoms; no freezing point), Pripol 1013 (dimer acid having 36 carbon atoms; no freezing point) and Pripol 1004 (dimer acid having 44 carbon atoms; no freezing point) manufactured by Croda Japan KK, HARIDIMER 200 (dimer acid having 36 carbon atoms; no freezing point), HARIDIMER 250 (dimer acid having 36 carbon atoms; no freezing point) and HARIDIMER 270S (dimer acid having 36 carbon atoms; no freezing point) made by Harima Chemicals Co., Ltd., and Tsunodime 205 (dimer acid having 36 carbon atoms; no freezing point), Tsunodime 206 (dimer acid having 36 carbon atoms; no freezing point) and Tsunodime 228 (dimer acid having 36 carbon atoms; no freezing point) made by Tsuno Co.

Ltd.; trimer acids which are prepared by the trimerization of unsaturated aliphatic acid such as Pripol 1040 (dimer acid having 54 carbon atoms; no freezing point) manufactured by Croda Japan KK and Tsunodime 346 (dimer acid having 54 carbon atoms; no freezing point) made by Tsuno Co. Ltd.; unsaturated long chain alcohols such as oleyl alcohol (freezing point: 2° C.) and linoleyl alcohol (freezing point: −5° C.); branched long chain alcohols such as FINEOXOCOL 180 (isostearyl alcohol; freezing point: at most −90° C.), FINEOXOCOL 180 N (isostearyl alcohol; freezing point: at most −30° C.), FINEOXOCOL 180 T (isostearyl alcohol; freezing point: at most −30° C.), FINEOXOCOL 1600 (isocetyl alcohol; freezing point: at most −30° C.) and FINEOXOCOL 2000 (isoarachidyl alcohol; freezing point: at most −30° C.) manufactured by Nissan Chemical Corporation; and dimer diols which are prepared by the reduction of the above-mentioned dimer acids such as Pripol 2033 (dimer diol having 36 carbon atoms; no freezing point) manufactured by Croda Japan KK. These may be used either singly or in combination.

In the composition of this invention, the weight ratio of component [A] to component [B] ranges from 95:5 to 60:40. In other words, component [A]/(component [A]+component [B]) is from 95 to 60%, and component [B]/(component [A]+component [B]) is from 5 to 40%. When the content of component [B] is less than 5 parts per 95 parts of component [A], dispersibility and/or anti-settling properties decrease, while, when the content of component [B] is more than 40 parts per 60 parts of component [A], anti-settling properties remarkably decreases since component [B] itself has no effect of giving thixotropy.

In order that the mixture of component [A] and component [B] may be easily dispersed into medium, the composition of this invention may contain surfactant where necessary. There is no particular limitation on what kind of surfactant is to be used. Nonionic surfactant and/or anionic surfactant or the like are available.

Examples of the above-mentioned nonionic surfactant include polyoxyethylene alkyl ether, polyoxyethylene alkyl aryl ether, sorbitan aliphatic ester, polyoxyethylene sorbitan aliphatic ester, polyoxyethylene-polyoxypropylene copolymer, or the like. These may be used either singly or in combination.

Examples of the above-mentioned anionic surfactant include alkyl fatty acid salt, alkyl sulfate ester salt, polyoxyethylene alkyl ether sulfate, alkyl benzene sulfonate, sulfosuccinate, phosphate ester salt, or the like. These may be used either singly or in combination.

In order that the mixture of component [A] and component [B] may be easily dispersed into medium, the composition of this invention may contain organic solvent where necessary. Although aliphatic hydrocarbon, alicyclic hydrocarbon, aromatic hydrocarbon, ketone, ester, alcohol, ether, or the like, can be mentioned as a usable organic solvent, those which are generally used for water-based coating material are preferable. Examples of such an organic solvent include methyl alcohol, ethyl alcohol, propyl alcohol, butyl alcohol, isopropyl alcohol, isobutyl alcohol, pentyl alcohol, hexyl alcohol, heptyl alcohol, octyl alcohol, 2-ethylhexyl alcohol, ethylene glycol monomethyl ether, diethylene glycol monomethyl ether, triethylene glycol monomethyl ether, ethylene glycol mono isopropyl ether, ethylene glycol monobutyl ether, diethylene glycol monobutyl ether, triethylene glycol monobutyl ether, ethylene glycol mono isobutyl ether, ethylene glycol monohexyl ether, 2-ethylhexyl glycol, propylene glycol monomethyl ether, dipropylene glycol monomethyl ether, propylene glycol monopropyl ether, propylene glycol monobutyl ether, or the like. These may be used either singly or in combination.

The composition of this invention may contain adjuvant to perform other functions. For instance, when the composition of this invention is to be added to a water-based paint, an adjuvant of various kinds may be added for the purpose of improvement of dispersibility in the paint, retention of gloss of coating film, dispersibility of pigment, defoaming property of coating material, or of runner surface.

When the composition of this invention is to be produced, components [A] and [B] which are essential components are mixed with surfactant, organic solvent, adjuvant, etc., which are optional components. Although there is no particular limitation on mixing condition, those components are to be mixed usually at temperature of 90 to 150° C., since mixing efficiency enhances when the components are in a dissolved state. Subsequently, the resultant mixture is dispersed, with stirring, in a medium which is mainly composed of water, and, thus, the composition of this invention can be produced.

In this invention, the above-mentioned mixture of components [A] and [B] and optional ones such as surfactant, organic solvent and adjuvant is preferably neutralized with a base. This base for neutralization may be an inorganic or organic one or a combination of inorganic and organic ones. For inorganic base for neutralization, there is used an aqueous solution of hydroxide of alkali metal element such as sodium hydroxide and potassium hydroxide, or an aqueous solution of ammonia, or the like. For organic base for neutralization, there are used alkyl amines such as ethyl amine and diethyl amine, or amino alcohol such as triethanol amine, N-methyl diethanol amine and N,N-dimethyl ethanol amine.

There is no particular limitation on the amount of base for neutralization which is to be used in neutralizing step. Preferably, however, it is equivalent to, or more than, the total of components [A] and [B] in the mixture. Neutralization makes it possible to inhibit the formation of poorly dispersed matters in anti-settling agent.

The mixture which has been neutralized with the base for neutralization is dispersed, with stirring, into a medium which is mainly composed of water. There is no particular limitation on the temperature of the neutralized mixture which is to be dispersed in a medium. Preferably, however, it is 80 to 160° C., more desirably 110 to 130° C. When the temperature is lower than 80° C., the mixture has high viscosity, which makes the mixture hard to handle. When the temperature is higher than 160° C., the mixture is liable to cause foaming when added to medium, which makes it undesirably hard to produce a stable water-based anti-settling agent.

There is no particular limitation on the temperature of the medium to which the mixture which has been neutralized with the base for neutralization is to be added. Preferably, however, it is 25 to 99° C., more desirably 40 to 80° C. When the temperature is lower than 25° C., the mixture is only poorly dispersed. When the temperature is higher than 99° C., it is hard to produce a stable water-based anti-settling agent due to foaming. Incidentally, in order that the neutralized mixture may be easily dispersed into medium, the medium may contain surfactant, organic solvent, or the like, where necessary.

When the mixture which has been neutralized with the base for neutralization is added to the medium, usually the mixture is instantly dispersed. Preferably, however, stirring is to be continued for 5 to 30 minutes after the mixture has been added to the medium, and, then, the resultant mixture is to be transferred to another vessel and left to stand still overnight, so that the mixture may be completely dispersed.

The composition of this invention is usable as an anti-settling agent for aqueous paint which is made from various materials. The composition of this invention is in particular suitable as a thixotropy-giving anti-settling agent for various kinds of interior or exterior painting, a thixotropy-giving anti-settling agent for automotive painting, and as a thixotropy-giving anti-settling agent for automotive repair painting.

When the composition of this invention is to be added to an aqueous paint for instance, the time of addition may be during the step of kneading pigment or after the production of aqueous paint. For the purpose of dispersing the composition of this invention into aqueous paint, there can be used a disperser which is generally employed for the production of aqueous paint.

When the composition of this invention is to be added to an aqueous paint, the amount of addition usually accounts, in terms of polyamide component, for 0.05 to 2.0% by weight, preferably for 0.06 to 1.6% by weight, more desirably for 0.07 to 1.2% by weight, based on the total weight of paint, although it varies dependent on the species of aqueous paint or on the performance required. When the amount of addition is less than 0.05% by weight, anti-settling effect is insufficient. When it is more than 2.0% by weight, there are caused undesirable effects such as the thickening of paint and the decrease of distinctness-of-image gloss.

Examples of suitable aqueous paint to which the anti-settling agent composition of this invention is to be added include those which contain acrylic resin, alkyd resin, polyester resin or urethane resin. Also usable is aqueous paint which comprises a curing agent-containing amino resin, blocked isocyanate, epoxy compound or the like.

Examples of pigment and filler which are used for aqueous paint include light interference flake pigment such as aluminum oxide, interference mica pigment, white mica pigment, or the like; organic pigment such as azochelate-based pigment, insoluble azo pigment, condensed azo pigment, indigo pigment, futarocyanine pigment, dioxane pigment, perinone pigment, perylene pigment, chinacridon pigment, isoindolinone pigment, or the like; and inorganic pigment such as chrome yellow, zinc iron oxide, red iron oxide, carbon black, titanium dioxide, aluminum, copper, zinc, iron, nickel, tin, or the like. The anti-settling agent composition of this invention allows, when polyamide is dispersed, a network-like structure to form spontaneously in paint to thicken the paint, and to thereby prevent the pigment from settling. Hence, the anti-settling agent composition of this invention exhibits its effects regardless of the species of paint or pigment.

Paint is prepared by kneading the blend comprising pigment and the like with kneader or roll, and/or by dispersing the same with a sand grind mill or a disper.

Insofar as the special properties of the anti-settling agent composition of this invention are not diminished, or insofar as the objective of this invention is not defeated, the composition of this invention can be used together with other material or additive such as surfactant, film-forming aid, drier, antifouling agent, thickening agent, antioxidant, ultraviolet absorber, water resistant additive, antiseptic and antifungal agent, defoaming agent, leveling agent, dispersant, fire retardant, adhesion improver, coloring agent, antistatic agent, peeler, coupling agent, deodorant, flagrance and dye.

Paint or overcoating which comprises the composition of this invention can be applied by any means, including spray coating, roller coating, brush coating, curtain coating, or the like.

Paint which comprises the composition of this invention can be cured by any means, including normal temperature curing, heat curing, ultraviolet curing, or the like.

Examples of substrate for paint include, with no particular limitation, metal, wood, plastic, rubber, paper, glass, stone, cement, mortar, ceramics, or the like.

The layer of coating film which is formed from paint composition may be a single layer or a laminate of plural coating films. When a laminate of coating films is to be prepared, each coating may be applied on a layer of coating film which has already been cured, or a coating may be applied on uncured coating film in wet-on-wet manner so that all the uncured coating films may be cured simultaneously.

Paint composition to which the anti-settling agent composition of this invention has been added may be used suitably, with no particular limitation, for the coating of automobile, railroad car, ship, airplane, electric appliance, building structure, automotive device, home appliances, machine, furniture, or the like.

EXAMPLES

In the following, this invention is explained concretely by working examples. The following Examples are not to restrict this invention in any way. In Examples, "%" and "parts" mean "% by weight" and "parts by weight" unless otherwise specified.

Polyamide Synthesis Test Example 1

There were weighed out 490.7 parts (0.83 mole) of dimer acid (trademark: HARIDIMER 250, made by Harima Chemicals Co., Ltd.) and 100 parts of xylene (20.4% of total carboxylic acid) and transferred to a one-liter four neck flask equipped with agitator, temperature adjuster, distributor and nitrogen introduction pipe. The resultant mixture was heated to 50° C. Then, 39.3 parts (0.65 mole) of ethylene diamine was added gradually, and was stirred at 150° C. for 60 minutes. Subsequently, the temperature was raised moderately to 175° C., and a dehydration reaction was conducted for 150 minutes to give polyamide a-1.

Polyamide Synthesis Test Examples 2-9

Diamine and dicarboxylic acid, or diamine, dicarboxylic acid and monocarboxylic acid were subjected to synthesis according to the synthetic method of Polyamide Synthesis Test Example 1 by the formulation of Table 1 to give polyamides a-2 to a-9.

Polyamide Synthesis Test Example 10

Dimer diamine (trademark: Versamine® 551 made by BASF) as a diamine and adipic acid as a dicarboxylic acid were subjected to synthesis according to the synthetic method of Polyamide Synthesis Test Example 1 by the formulation of Table 1 to give polyamide a-10.

Polyamide Synthesis Test Examples 11-16

Diamine and dicarboxylic acid were subjected to synthesis according to the synthetic method of Polyamide Synthesis Test Example 1 by the formulation of Table 1 to give polyamides a-11 to a-16.

TABLE 1

Formulation (molar ratio) of Polyamide Synthesis Test Examples

| | | Polyamide [A] | | | | | | | |
|---|---|---|---|---|---|---|---|---|---|
| | | a-1 | a-2 | a-3 | a-4 | a-5 | a-6 | a-7 | a-8 |
| Diamine | Ethylene diamine | 0.65 | 0.48 | 0.05 | | 0.64 | | | 0.45 |
| | Hexamethylene diamine | | | | 0.55 | | 0.41 | 0.29 | |
| | Octamethylene diamine | | | | | | | | |
| | Dodecamethylene diamine | | | | | | | | |
| | Isophorone diamine | | | | | | | | |
| | Dimer diamine | | | | | | | | |
| Dicarboxylic acid | Dimer acid | 0.83 | 0.85 | 0.83 | 0.78 | 0.82 | 0.78 | 0.83 | 0.56 |
| | Sebacic acid | | | 0.04 | | | | | 0.06 |
| | Azelaic acid | | | | 0.01 | | | 0.04 | |
| | Adipic acid | | | | | 0.06 | | | |
| Monocarboxylic acid | 12-Hydroxystearic acid | | | | | | 0.08 | | |
| Acid value | | 37 | 86 | 77 | 56 | 63 | 90 | 126 | 57 |

| | | Polyamide [A] | | | | | | | |
|---|---|---|---|---|---|---|---|---|---|
| | | a-9 | a-10 | a-11 | a-12 | a-13 | a-14 | a-15 | a-16 |
| Diamine | Ethylene diamine | | | 0.27 | | | | 0.63 | |
| | Hexamethylene diamine | 0.50 | | 0.27 | | | | | 0.59 |
| | Octamethylene diamine | | | | 0.47 | | | | |
| | Dodecamethylene diamine | | | | | 0.42 | | | |
| | Isophorone diamine | | | | | | 0.57 | | |
| | Dimer diamine | | 0.69 | | | | | | |
| Dicarboxylic acid | Dimer acid | 0.78 | | 0.82 | 0.78 | 0.75 | 0.68 | 0.76 | 0.71 |
| | Sebacic acid | | | | | | | | |
| | Azelaic acid | 0.07 | | | 0.02 | | | 0.23 | 0.22 |
| | Adipic acid | | 1.04 | | | | 0.22 | | |
| Monocarboxylic acid | 12-Hydroxystearic acid | | | | | | | | |
| Acid value | | 79 | 77 | 64 | 75 | 75 | 69 | 84 | 78 |

Formulation Example 1

There was weighed out 133.7 parts of deionized water, transferred to a 500 ml four neck flask equipped with agitator, condenser tube and thermometer, and was then heated to 75° C. On the other hand, 36.0 parts of polyamide (a-1) as component [A], 20.0 parts of isostearyl alcohol (trademark: FINEOXOCOL 180, manufactured by Nissan Chemical Corporation) as component [B] and 8.0 parts of propylene glycol monomethyl ether as a solvent were mixed at 120° C. to give a liquid mixture. To this liquid mixture, 2.3 parts of N,N-dimethyl ethanol amine as a base for neutralization was added, and the resultant mixture was gradually added into warm water in the flask with stirring. After this addition was over, stirring was further continued for 30 minutes at temperature ranging from 80 to 50° C., for the sake of complete dispersing, and, thus, a dispersion was obtained. After the stirring was finished, this dispersion was transferred to a vessel, and was left to stand still at room temperature for 24 hours to give anti-settling agent A1.

Formulation Examples 2 to 8

Anti-settling agents A2 to A8 were obtained as desired by the same method as in Formulation Example 1 according to the formulation of Table 2.

Formulation Comparative Example 1

There was weighed out 150.6 parts of deionized water, transferred to a 500 ml four neck flask equipped with agitator, condenser tube and thermometer, and was then heated to 75° C. On the other hand, 36.0 parts of polyamide (a-2) as component [A] and 8.0 parts of propylene glycol monomethyl ether as a solvent were mixed and dissolved at 120° C. to give a liquid mixture. To this liquid mixture, 5.4 parts of N,N-dimethyl ethanol amine as a base for neutralization was added, and the resultant mixture was gradually added into warm water in the flask. After this addition was over, stirring was further continued for 30 minutes at temperature ranging from 80 to 50° C., for the sake of complete dispersing, and, thus, a dispersion was obtained. After the stirring was finished, this dispersion was transferred to a vessel, and was left to stand still at room temperature for 24 hours to give anti-settling agent for comparison H1.

Formulation Comparative Examples 2 to 3

Anti-settling agents for comparison H2 and H3 were obtained as desired by the same method as in Formulation Comparative Example 1 according to the formulation of Table 2.

parts of polyoxyethylene lauryl ether having an HLB of 12.6 (trademark: BLAUNON. EL-1508P, manufactured by Aoki Oil Industrial Co., Ltd.) and 8.0 parts of propylene glycol monomethyl ether as a solvent were mixed and dissolved at 120° C. to give a liquid mixture. To this liquid mixture, 2.5 parts of N,N-dimethyl ethanol amine as a base for neutral-

TABLE 2

| | | | Component B Freezing point (° C.) | Anti-settling agents (Examples) | | | | | | | | Anti-settling agents (Comparative Examples) | | |
|---|---|---|---|---|---|---|---|---|---|---|---|---|---|---|
| | | | | A1 | A2 | A3 | A4 | A5 | A6 | A7 | A8 | H1 | H2 | H3 |
| Constituent components | Component A | a-1 | — | 36.0 | 36.0 | 36.0 | | | | | | | | |
| | | a-2 | — | | | | | | | | | 36.0 | | |
| | | a-3 | — | | | | 30.8 | | | | | | 40.0 | |
| | | a-4 | — | | | | | 36.0 | | | | | | 36.0 |
| | | a-5 | — | | | | | | 36.0 | | | | | |
| | | a-6 | — | | | | | | | 40.0 | | | | |
| | | a-7 | — | | | | | | | | 36.0 | | | |
| | Component B | FINEOXOCOL 180 | −30 or less | 20.0 | 3.6 | | | | | 10.0 | | | | |
| | | Oleyl alcohol | 2 | | | | 8.8 | | | | | | | |
| | | HARIDIMER 250 | None | | | 20.0 | 4.4 | 20.0 | 24.0 | | 2.0 | | | |
| | Solvent | Propylene glycol monomethyl ether | | 8.0 | 8.0 | 8.0 | 8.0 | 8.0 | 8.0 | 8.0 | 8.0 | 8.0 | | |
| | | Propylene glycol monobutyl ether | | | | | | | | | | | 10.0 | 9.0 |
| | Base for neutralization | | | 2.3 | 2.3 | 9.0 | 4.4 | 10.0 | 10.3 | 4.5 | 11.5 | 5.4 | 5.4 | 3.4 |
| | Deionized water | | | 133.7 | 150.1 | 127.0 | 143.6 | 126.0 | 121.7 | 137.5 | 144.5 | 150.6 | 144.6 | 151.6 |
| Total | | | | 200.0 | 200.0 | 200.0 | 200.0 | 200.0 | 200.0 | 200.0 | 200.0 | 200.0 | 200.0 | 200.0 |
| Solids content (%) | | | | 28.0 | 19.8 | 28.0 | 22.0 | 28.0 | 30.0 | 25.0 | 19.0 | 18.0 | 20.0 | 18.0 |
| Concentration of polyamide (%) | | | | 18.0 | 18.0 | 18.0 | 15.4 | 18.0 | 18.0 | 20.0 | 18.0 | 18.0 | 20.0 | 18.0 |
| A/(A + B) (%) | | | | 64.3 | 90.9 | 64.3 | 70.0 | 64.3 | 60.0 | 80.0 | 94.7 | 100.0 | 100.0 | 100.0 |
| B/(A + B) (%) | | | | 35.7 | 9.1 | 35.7 | 30.0 | 35.7 | 40.0 | 20.0 | 5.3 | 0.0 | 0.0 | 0.0 |

Formulation Example 9

There was weighed out 125.8 parts of deionized water, transferred to a 500 ml four neck flask equipped with agitator, condenser tube and thermometer, and was then heated to 75° C. On the other hand, 36.0 parts of polyamide (a-8) as component [A], 20.0 parts of dimer acid (trademark: HARIDIMER 250, made by Harima Chemicals Co., Ltd.) as component [B] and 8.0 parts of propylene glycol monomethyl ether as a solvent were mixed and dissolved at 120° C. to give a liquid mixture. To this liquid mixture, 10.2 parts of N,N-dimethyl ethanol amine as a base for neutralization was added, and the resultant mixture was gradually added into warm water in the flask with stirring. After this addition was over, stirring was further continued for 30 minutes at temperature ranging from 80 to 50° C., for the sake of complete dispersing, and, thus, a dispersion was obtained. After the stirring was finished, this dispersion was transferred to a vessel, and was left to stand still at room temperature for 24 hours to give anti-settling agent A9.

Formulation Example 10

Anti-settling agent A10 was obtained as desired by the same method as in Formulation Example 9 according to the formulation of Table 3.

Formulation Comparative Example 4

There was weighed out 139.5 parts of deionized water, transferred to a 500 ml four neck flask equipped with agitator, condenser tube and thermometer, and was then heated to 75° C. On the other hand, 33.4 parts of polyamide (a-1) as component [A], 6.6 parts of oxidized polyethylene wax having an acid value of 30 mgKOH/g (trademark: Hi-WAX 2203A, manufactured by Mitsui Chemicals), 10.0 ization was added, and the resultant mixture was gradually added into warm water in the flask. After this addition was over, stirring was further continued for 30 minutes at temperature ranging from 80 to 50° C., for the sake of complete dispersing, and, thus, a dispersion was obtained. After the stirring was finished, this dispersion was transferred to a vessel, and was left to stand still at room temperature for 24 hours to give anti-settling agent for comparison H4.

Formulation Comparative Example 5

There was weighed out 146.6 parts of deionized water, transferred to a 500 ml four neck flask equipped with agitator, condenser tube and thermometer, and was then heated to 75° C. On the other hand, 33.4 parts of polyamide (a-2) as component [A], 6.6 parts of 12-hydroxystearic acid polymer having a degree of polymerization of 6 (trademark: K-PON 306, manufactured by Kokura Synthetic Industry Co., Ltd.) and 8.0 parts of propylene glycol monomethyl ether as a solvent were mixed and dissolved at 120° C. to give a liquid mixture. To this liquid mixture, 5.4 parts of N,N-dimethyl ethanol amine as a base for neutralization was added, and the resultant mixture was gradually added into warm water in the flask. After this addition was over, stirring was further continued for 30 minutes at temperature ranging from 80 to 50° C., for the sake of complete dispersing, and, thus, a dispersion was obtained. After the stirring was finished, this dispersion was transferred to a vessel, and was left to stand still at room temperature for 24 hours to give anti-settling agent for comparison H5.

Formulation Comparative Examples 6 and 7

Anti-settling agents for comparison H6 and H7 were obtained as desired by the same method as in Formulation Comparative Examples 4 and 5 respectively, and according to the formulation of Table 3.

TABLE 3

| | | | | Formulation Examples 2 (weight ratio) | | | | | |
|---|---|---|---|---|---|---|---|---|---|
| | | | Component B Freezing point (° C.) | Anti-settling agents (Examples) | | Anti-settling agents (Comparative Examples) | | | |
| | | | | A9 | A10 | H4 | H5 | H6 | H7 |
| Constituent components | Component A | a-1 | — | | | 33.4 | | | |
| | | a-2 | — | | | | 33.4 | | |
| | | a-8 | — | 36.0 | | | | | |
| | | a-9 | — | | 40.0 | | | | |
| | | a-10 | — | | | | | 33.4 | 33.3 |
| | Component B | HARIDIMER 250 | None | 20.0 | | | | | |
| | | Oleic acid | 9 or less | | 10.0 | | | | |
| | Oxidized polyethylene (acid value of 30 mgKOH/g) | | Melting point 107° C. | | | 6.6 | | 6.6 | |
| | 12-Hydroxystearic acid polymer having a degree of polymerization of 6 | | Liquid at normal temperature | | | | 6.6 | | 6.6 |
| | Surfactant (polyoxyethylene lauryl ether having an HLB of 12.6) | | | | | 10.0 | 10.0 | | |
| | Solvent | Propylene glycol monomethyl ether | | 8.0 | 14.0 | 8.0 | 8.0 | 8.0 | 8.0 |
| | | Propylene glycol monobutyl ether | | | | | | | |
| | Base for neutralization | | | 10.2 | 8.8 | 2.5 | 5.4 | 4.8 | 5.3 |
| | Deionized water | | | 125.8 | 127.2 | 139.5 | 146.6 | 137.2 | 146.8 |
| Total | | | | 200.0 | 200.0 | 200.0 | 200.0 | 200.0 | 200.0 |
| Solids content (%) | | | | 28.0 | 25.0 | 25.0 | 20.0 | 25.0 | 20.0 |
| Concentration of polyamide (%) | | | | 18.0 | 20.0 | 16.7 | 16.7 | 16.7 | 16.7 |
| A/(A + B) (%) | | | | 64.3 | 80.0 | 100.0 | 100.0 | 100.0 | 100.0 |
| B/(A + B) (%) | | | | 35.7 | 20.0 | 0.0 | 0.0 | 0.0 | 0.0 |

Formulation Example 11

There was weighed out 147.7 parts of deionized water, transferred to a 500 ml four neck flask equipped with agitator, condenser tube and thermometer, and was then heated to 75° C. On the other hand, 36.0 parts of polyamide (a-2) as component [A], 1.9 parts of oleyl alcohol as component [B] and 9.0 parts of propylene glycol monobutyl ether as a solvent were mixed and dissolved at 120° C. to give a liquid mixture. To this liquid mixture, 5.4 parts of N,N-dimethyl ethanol amine as a base for neutralization was added, and the resultant mixture was gradually added into warm water in the flask with stirring. After this addition was over, stirring was further continued for 30 minutes at temperature ranging from 80 to 50° C., for the sake of complete dispersing, and, thus, a dispersion was obtained. After the stirring was finished, this dispersion was transferred to a vessel, and was left to stand still at room temperature for 24 hours to give anti-settling agent A11.

Formulation Examples 12 to 24

Anti-settling agents A12 to 24 were obtained as desired by the same method as in Formulation Example 11 according to the formulation of Table 4.

Formulation Comparative Example 8

There was weighed out 151.2 parts of deionized water, transferred to a 500 ml four neck flask equipped with agitator, condenser tube and thermometer, and was then heated to 75° C. On the other hand, 36.0 parts of polyamide (a-9) as component [A] and 8.0 parts of propylene glycol monomethyl ether as a solvent were mixed and dissolved at 120° C. to give a liquid mixture. To this liquid mixture, 4.8 parts of N,N-dimethyl ethanol amine as a base for neutralization was added, and the resultant mixture was gradually added into warm water in the flask. After this addition was over, stirring was further continued for 30 minutes at temperature ranging from 80 to 50° C., for the sake of complete dispersing, and, thus, a dispersion was obtained. After the stirring was finished, this dispersion was transferred to a vessel, and was left to stand still at room temperature for 24 hours to give anti-settling agent for comparison H6.

Formulation Comparative Examples 9 to 10

Anti-settling agents for comparison H9 and H10 were obtained as desired by the same method as in Formulation Comparative Example 8 according to the formulation of Table 4.

Formulation Comparative Examples 11 to 12

Anti-settling agents for comparison H11 and H12 were obtained as desired by the same method as in Formulation Comparative Examples 4 and 5 respectively, according to the formulation of Table 4.

TABLE 4

Formulation Examples 3 (weight ratio)

| | | Component B Freezing point(° C.) | Anti-settling agents (Examples) | | | | | | |
|---|---|---|---|---|---|---|---|---|---|
| | | | A11 | A12 | A13 | A14 | A15 | A16 | A17 |
| Constituent components | Component A a-2 | — | 36.0 | 36.0 | | | | | |
| | a-8 | — | | | 36.0 | 36.0 | | | |
| | a-9 | — | | | | | | | |
| | a-11 | — | | | | | 33.0 | | |
| | a-12 | — | | | | | | 36.0 | |
| | a-13 | — | | | | | | | 36.0 |
| | a-14 | — | | | | | | | |
| | a-15 | — | | | | | | | |
| | a-16 | — | | | | | | | |
| | Component B Oleyl alcohol | 2 | 1.9 | | | | | | |
| | FINEOXOCOL 180 | −30 or less | | 1.9 | | | | | |
| | Neodecanoic acid | −30 or less | | | 20.0 | | | | 6.0 |
| | Tsunodime 346 | None | | | | 20.0 | 13.8 | | |
| | Dimer diol | None | | | | | | | |
| | HARIDIMER 250 | None | | | | | | 12.0 | |
| | Dimer acid having 44 carbon atoms | None | | | | | | | |
| | Oxidized polyethylene (acid value 30 mgKOH/g) | Solid at normal temperature | | | | | | | |
| | 12-Hydroxystearic acid polymer having a degree of polymerization of 6 | Liquid at normal temperature | | | | | | | |
| | Surfactant (polyoxyethylene lauryl ether having an HLB of 12.6) | | | | | | | | |
| | Solvent Propylene glycol monomethyl ether | | | | 12.6 | 14.0 | 8.0 | | |
| | Propylene glycol monobutyl ether | | 9.0 | 9.0 | | | | 9.0 | 10.0 |
| | Base for neutralization | | 5.4 | 5.4 | 13.9 | 10.4 | 9.1 | 8.5 | 7.6 |
| | Deionized water | | 147.7 | 147.7 | 117.5 | 119.6 | 136.1 | 134.5 | 140.4 |
| Total | | | 200.0 | 200.0 | 200.0 | 200.0 | 200.0 | 200.0 | 200.0 |
| Solids content (%) | | | 19.0 | 19.0 | 28.0 | 28.0 | 23.4 | 24.0 | 21.0 |
| Concentration of polyamide (%) | | | 18.0 | 18.0 | 18.0 | 18.0 | 16.5 | 18.0 | 18.0 |
| A/(A + B) (%) | | | 95.0 | 95.0 | 64.3 | 64.3 | 70.5 | 75.0 | 85.7 |
| B/(A + B) (%) | | | 5.0 | 5.0 | 35.7 | 35.7 | 29.5 | 25.0 | 14.3 |

| | | Component B Freezing point(° C.) | Anti-settling agents (Examples) | | | | | | |
|---|---|---|---|---|---|---|---|---|---|
| | | | A18 | A19 | A20 | A21 | A22 | A23 | A24 |
| Constituent components | Component A a-2 | — | | | | | | | |
| | a-8 | — | | | | | | | |
| | a-9 | — | 36.0 | | | | | | |
| | a-11 | — | | | | | | | |
| | a-12 | — | | | | | | | |
| | a-13 | — | | | | | | | |
| | a-14 | — | 18.0 | | | | | | |
| | a-15 | — | | 36.0 | 36.0 | 36.0 | 36.0 | | |
| | a-16 | — | | | | | | 36.0 | 36.0 |
| | Component B Oleyl alcohol | 2 | | | | | | | |
| | FINEOXOCOL 180 | −30 or less | | | | | | | |
| | Neodecanoic acid | −30 or less | | 12.0 | | | | | |
| | Tsunodime 346 | None | | | | | | | |
| | Dimer diol | None | | | 12.0 | | 2.0 | | 2.0 |
| | HARIDIMER 250 | None | 12.0 | | | | 12.0 | 12.0 | 12.0 |
| | Dimer acid having 44 carbon atoms | None | | | | 12.0 | | | |
| | Oxidized polyethylene (acid value 30 mgKOH/g) | Solid at normal temperature | | | | | | | |
| | 12-Hydroxystearic acid polymer having a degree of polymerization of 6 | Liquid at normal temperature | | | | | | | |
| | Surfactant (polyoxyethylene lauryl ether having an HLB of 12.6) | | | | | | | | |
| | Solvent Propylene glycol monomethyl ether | | 12.6 | 12.6 | 12.6 | 12.6 | 12.6 | 12.6 | 12.6 |
| | Propylene glycol monobutyl ether | | | | | | | | |
| | Base for neutralization | | 11.0 | 11.5 | 5.3 | 8.8 | 9.3 | 8.9 | 8.9 |
| | Deionized water | | 110.4 | 127.9 | 134.1 | 130.6 | 128.1 | 130.5 | 128.5 |
| Total | | | 200.0 | 200.0 | 200.0 | 200.0 | 200.0 | 200.0 | 200.0 |
| Solids content (%) | | | 33.0 | 24.0 | 24.0 | 24.0 | 25.0 | 24.0 | 25.0 |
| Concentration of polyamide (%) | | | 27.0 | 18.0 | 18.0 | 18.0 | 18.0 | 18.0 | 18.0 |
| A/(A + B) (%) | | | 81.8 | 75.0 | 75.0 | 75.0 | 72.0 | 75.0 | 72.0 |
| B/(A + B) (%) | | | 18.2 | 25.0 | 25.0 | 25.0 | 28.0 | 25.0 | 28.0 |

TABLE 4-continued

Formulation Examples 3 (weight ratio)

| | | | Component B Freezing point(° C.) | Anti-settling agents (Comparative Examples) | | | | |
|---|---|---|---|---|---|---|---|---|
| | | | | H8 | H9 | H10 | H11 | H12 |
| Constituent components | Component A | a-2 | — | | | | | |
| | | a-8 | — | | | | | |
| | | a-9 | — | 36.0 | | | | |
| | | a-11 | — | | | | | |
| | | a-12 | — | | | | | |
| | | a-13 | — | | | | | |
| | | a-14 | — | | 36.0 | | | |
| | | a-15 | — | | | | 33.4 | 33.4 |
| | | a-16 | — | | | 36.0 | | |
| | Component B | Oleyl alcohol | 2 | | | | | |
| | | FINEOXOCOL 180 | −30 or less | | | | | |
| | | Neodecanoic acid | −30 or less | | | | | |
| | | Tsunodime 346 | None | | | | | |
| | | Dimer diol | None | | | | | |
| | | HARIDIMER 250 | None | | | | | |
| | | Dimer acid having 44 carbon atoms | None | | | | | |
| | Oxidized polyethylene (acid value 30 mgKOH/g) | | Solid at normal temperature | | | | 6.6 | |
| | 12-Hydroxystearic acid polymer having a degree of polymerization of 6 | | Liquid at normal temperature | | | | | 6.6 |
| | Surfactant (polyoxyethylene lauryl ether having an HLB of 12.6) | | | | | | 10.0 | |
| | Solvent | Propylene glycol monomethyl ether | | 8.0 | 8.0 | 12.6 | 8.0 | 8.0 |
| | | Propylene glycol monobutyl ether | | | | | | |
| | Base for neutralization | | | 4.8 | 4.5 | 4.9 | 5.2 | 5.3 |
| | Deionized water | | | 151.2 | 151.5 | 146.5 | 136.8 | 146.7 |
| Total | | | | 200.0 | 200.0 | 200.0 | 200.0 | 200.0 |
| Solids content (%) | | | | 18.0 | 18.0 | 18.0 | 25.0 | 20.0 |
| Concentration of polyamide (%) | | | | 18.0 | 18.0 | 18.0 | 16.7 | 16.7 |
| A/(A + B) (%) | | | | 100.0 | 100.0 | 100.0 | 100.0 | 100.0 |
| B/(A + B) (%) | | | | 0.0 | 0.0 | 0.0 | 0.0 | 0.0 |

Test Example 1

The anti-settling agent was tested for performance with a water-based paint having the formulation (parts by weight) of Table 5.

Preparation of Water-Based Acrylic Paint:

Water-soluble acrylic resin (trademark: Watersol S-727, manufactured by DIC Corporation), deionized water, N,N-dimethyl ethanol amine and pearl mica pigment (trademark: Iriodin 504 Red, manufactured by Merck Performance Materials Co., Ltd.) were mixed with stirring. Subsequently, 0.6% by weight (in terms of polyamide component) of an aqueous anti-settling agent was added, and the resultant mixture was directly dispersed into the paint with Laboratory Disper (1800 rpm×15 minutes), with no preliminary dispersion prepared.

Viscosity and TI Value:

Viscosity (mPa·s) at 60 rpm and viscosity (mPa·s) at 6 rpm were measured with a B-type viscometer at 25° C., and the ratio (viscosity at 6 rpm/viscosity at 60 rpm) was calculated. The larger value of the ratio (TI value) means the greater thixotropy.

Dispersibility:

The particle size of the water-based paint was measured with a grind gauge of 0-100 μm. The smaller particle size shows the better dispersibility.

Anti-Settling Property:

The paint was diluted with deionized water to have a viscosity of 40 seconds (25° C.) when measured with Ford cup #4. Thus diluted paint was transferred to a 100 ml glass bottle, which was then put to stand still in a thermostatic bath at 25° C. for 3 days or for 7 days. When the percentage of the volume of thus settled Iriodin 504 Red to the volume of the total amount of the paint was subtracted from 100, thus found difference was supposed to show anti-settling property.

Test results are shown in Table 6. It is known from the results of Table 6 that, when added to water-based acrylic paint, the anti-settling agent for water-based paint of this invention exhibits good dispersibility even when added directly to the paint with no preliminary dispersion prepared, and also shows good anti-settling property of pigments.

It is seen, on the other hand, that H1 to H3 (anti-settling agents which do not contain component B) which are comparative examples give no such effects as mentioned above; H1 and H3 have good dispersibility, but have poor anti-settling properties, while H2 has good anti-settling properties but has poor dispersibility.

[Table 5]

TABLE 5

Formulation of water-based acrylic paint

| Raw material | Parts by weight (part) | Manufacturer of raw material |
|---|---|---|
| Watersol S-727 | 30.9 | DIC Corporation |
| Deionized water | 66.3 | — |
| N,N-dimethyl ethanol amine | 1.3 | Nippon Nyukazai Co., Ltd. |
| Iriodin 504 Red | 1.5 | Merck Performance Materials Co., Ltd. |

TABLE 6

Test results with water-based acrylic paint

| | | | Before dilution 60 rpm | | Anti-settling property (%) | | | Concentration | | |
| --- | --- | --- | --- | --- | --- | --- | --- | --- | --- | --- |
| | | | viscosity (mPa·s) | TI value | 25° C. 3 days | 25° C. 7 days | Dispersibility (μm) | of polyamide (%) | A/(A + B) (%) | B/(A + B) (%) |
| Blank | | | 532 | 0.9 | 5 | 5 | <10 | — | — | — |
| Formulation Examples | Anti-settling agents | A1 | 904 | 1.6 | 100 | 100 | <10 | 18.0 | 64.3 | 35.7 |
| | | A2 | 755 | 1.8 | 98 | 98 | <10 | 18.0 | 90.9 | 9.1 |
| | | A3 | 1994 | 1.7 | 100 | 92 | <10 | 18.0 | 64.3 | 35.7 |
| | | A4 | 745 | 1.5 | 100 | 99 | <10 | 15.4 | 70.0 | 30.0 |
| | | A5 | 1093 | 2.6 | 100 | 100 | <10 | 18.0 | 64.3 | 35.7 |
| | | A6 | 2240 | 2.3 | 100 | 83 | <10 | 18.0 | 60.0 | 40.0 |
| | | A7 | 606 | 1.2 | 100 | 94 | <10 | 20.0 | 80.0 | 20.0 |
| | | A8 | 3211 | 2.0 | 91 | 91 | <10 | 18.0 | 94.7 | 5.3 |
| Formulation Comparative Examples | Anti-settling agents | H1 | 2402 | 2.4 | 11 | 10 | <10 | 18.0 | 100.0 | 0.0 |
| | | H2 | 815 | 1.6 | 100 | 100 | 100< | 20.0 | 100.0 | 0.0 |
| | | H3 | 4773 | 1.9 | 12 | 12 | <10 | 18.0 | 100.0 | 0.0 |

Test Example 2

The anti-settling agent was tested for performance with a water-based paint having the formulation (parts by weight) of Table 7.

Preparation of Water-Based Acrylic Emulsion Paint 1:

Water-soluble acrylic emulsion resin (trademark: Burnock WE-304, manufactured by DIC Corporation), deionized water, dibutyl diglycol and pearl mica pigment (trademark: Iriodin 504 Red, manufactured by Merck Performance Materials Co., Ltd.) were mixed with stirring. Subsequently, 0.4% by weight (in terms of polyamide component) of an aqueous anti-settling agent was added, and the resultant mixture was directly dispersed into the paint with Laboratory Disper (1800 rpm×15 minutes), with no preliminary dispersion prepared.

Viscosity and TI Value:

Viscosity (mPa·s) at 60 rpm and viscosity (mPa·s) at 6 rpm were measured with a B-type viscometer at 25° C., and the ratio (viscosity at 6 rpm/viscosity at 60 rpm) was calculated. The larger value of the ratio (TI value) means the greater thixotropy.

Dispersibility:

The particle size of the water-based paint was measured with a grind gauge of 0-100 μm. The smaller particle size shows the better dispersibility.

Anti-Settling Property:

The paint was diluted with deionized water to have a viscosity of 350 mPa·s as measured with a B-type viscometer at 60 rpm at 25° C. Thus diluted paint was transferred to a 100 ml glass bottle, which was then put to stand still in a thermostatic bath at 25° C. for 3 days or for 7 days. When the percentage of the volume of thus settled Iriodin 504 Red to the volume of the total amount of the paint was subtracted from 100, thus found difference was supposed to show anti-settling property.

Test results are shown in Table 8. It is known from the results of Table 8 that, when added to water-based acrylic emulsion paint, the anti-settling agent for water-based paint of this invention exhibits good dispersibility even when added directly to the paint with no preliminary dispersion prepared, and also shows good anti-settling property of pigments. Furthermore, since the composition of this invention gave moderate thixotropy to the blank paint, it is expected that the composition of this invention will provide suitable viscosity for spray coating of water-based paint which contains metallic pigment or pearl pigment, and will also give good appearance.

It is seen, on the other hand, that H1 and H2 (anti-settling agents which do not contain component B) have good anti-settling properties, but have poor dispersibility. H4 and H6, in which polyamide and polyethylene oxide have been blended, are inferior in either anti-settling properties or dispersibility, and do not have both good anti-settling properties and good dispersibility. It is considered that this result of H4 and H6 is caused by the aggregation and deposition of polyethylene oxide due to low compatibility between polyamide and polyethylene oxide and high freezing point of polyethylene oxide. In this way, dispersibility is liable to decrease when components of different species are combined or when combined material has a high freezing point. When the addition of surfactant does not achieve sufficient dispersion, aggregate may possibly be produced. H5 and H7 are cases where polyamide and 12-hydroxystearic acid polymer have been blended. Although H5 and H7 have no problem in anti-settling properties of 3 days, 7-days anti-settling property greatly decreased, and dispersibility was also bad.

TABLE 7

Formulation of water-based acrylic emulsion paint 1

| Raw material | Parts by weight (part) | Manufacturer of raw material |
| --- | --- | --- |
| Burnock WE-304 | 70.2 | DIC Corporation |
| Dibutyl diglycol | 12.6 | Nippon Nyukazai Co., Ltd. |
| Deionized water | 14.0 | — |
| Iriodin 504 Red | 3.2 | Merck Performance Materials Co., Ltd. |

TABLE 8

Test results with water-based acrylic emulsion paint 1

|  |  |  | Before dilution | | Anti-settling property (%) | | Dispersibility (μm) | Concentration of polyamide (%) | A/(A + B) (%) | B/(A + B) (%) |
|---|---|---|---|---|---|---|---|---|---|---|
|  |  |  | 60 rpm viscosity (mPa · s) | TI value | 25° C. 3 days | 25° C. 7 days |  |  |  |  |
| Blank |  |  | 470 | 1.1 | 88 | 8 | 30 | — | — | — |
| Formulation Examples | Anti-settling agents | A9 | 890 | 1.8 | 100 | 97 | 30 | 18.0 | 64.3 | 35.7 |
|  |  | A10 | 969 | 1.9 | 100 | 96 | 30 | 20.0 | 80.0 | 20.0 |
| Formulation Comparative Examples | Anti-settling agents | H1 | 476 | 1.2 | 100 | 93 | 90 | 18.0 | 100.0 | 0.0 |
|  |  | H2 | 574 | 1.4 | 100 | 97 | 100< | 20.0 | 100.0 | 0.0 |
|  |  | H4 | 307 | 0.9 | 90 | 8 | 40 | 16.7 | 100.0 | 0.0 |
|  |  | H5 | 354 | 1.0 | 90 | 8 | 50 | 16.7 | 100.0 | 0.0 |
|  |  | H6 | 472 | 1.2 | 100 | 97 | 100< | 16.7 | 100.0 | 0.0 |
|  |  | H7 | 333 | 0.9 | 91 | 8 | 80 | 16.7 | 100.0 | 0.0 |

Test Example 3

The anti-settling agent was tested for performance with a water-based paint having the formulation (parts by weight) of Table 9.
Preparation of Water-Based Acrylic Emulsion Paint 2:

Water-soluble acrylic emulsion resin (trademark: NeoCryl A-639, manufactured by DSM Coating Resins), deionized water, ethylene glycol monobutyl ether, N,N-dimethyl ethanol amine and pearl mica pigment (trademark: Iriodin 504 Red, manufactured by Merck Performance Materials Co., Ltd.) were mixed with stirring. Subsequently, 0.4% by weight (in terms of polyamide component) of an aqueous anti-settling agent was added, and the resultant mixture was directly dispersed into the paint with Laboratory Disper (1800 rpm×15 minutes), with no preliminary dispersion prepared.
Viscosity and TI Value:

Viscosity (mPa·s) at 60 rpm and viscosity (mPa·s) at 6 rpm were measured with a B-type viscometer at 25° C., and the ratio (viscosity at 6 rpm/viscosity at 60 rpm) was calculated. The larger value of the ratio (TI value) means the greater thixotropy.
Dispersibility:

The particle size of the water-based paint was measured with a grind gauge of 0-100 μm. The smaller particle size shows the better dispersibility.
Anti-Settling Property:

The paint was diluted with deionized water to have a viscosity of 200 mPa·s as measured with a B-type viscometer at 60 rpm at 25° C. Thus diluted paint was transferred to a 100 ml glass bottle, which was then put to stand still in a thermostatic bath at 25° C. for 3 days or for 7 days. When the percentage of the volume of thus settled Iriodin 504 Red to the volume of the total amount of the paint was subtracted from 100, thus found difference was supposed to show anti-settling property.

Test results are shown in Table 10. It is known from the results of Table 10 that, when added to water-based acrylic emulsion paint, the anti-settling agent for water-based paint of this invention exhibits good dispersibility even when added directly to the paint with no preliminary dispersion prepared, and also shows good anti-settling property of pigments.

On the other hand, H8 and H10 (anti-settling agents which do not contain component B) are each inferior in dispersibility, and thus fail to achieve both anti-settling properties and dispersibility. H6 and H11 are cases in which polyamide and polyethylene oxide have been blended, and H7 and H12 are cases where polyamide and 12-hydroxystearic acid polymer have been blended. In paint system of each of these cases, anti-settling properties decreased due to the combination of polyamide and a material which had low compatibility with polyamide; H6 and H7 were inferior also in dispersibility.

[Table 9]

TABLE 9

Formulation of water-based acrylic emulsion paint 2

| Raw material | Parts by weight (part) | Manufacturer of raw material |
|---|---|---|
| NeoCryl A-639 | 79.1 | DSM Coating Resins |
| Deionized water | 14.1 | — |
| Ethylene glycol monobutyl ether | 3.6 | Kyoei Chemical Co., Ltd. |
| N,N-dimethyl ethanol amine | 0.5 | Nippon Nyukazai Co., Ltd. |
| Iriodin 504 Red | 2.9 | Merck Performance Materials Co., Ltd. |

TABLE 10

Test results with water-based acrylic emulsion paint 2

|  |  |  | Before dilution | | Anti-settling property (%) | | Dispersibility (μm) | Concentration of polyamide (%) | A/(A + B) (%) | B/(A + B) (%) |
|---|---|---|---|---|---|---|---|---|---|---|
|  |  |  | 60 rpm viscosity (mPa · s) | TI value | 25° C. 3 days | 25° C. 7 days |  |  |  |  |
| Blank |  |  | 148.3 | 1.5 | 8 | 7 | 30 | — | — | — |
| Formulation Examples | Anti-settling agents | A10 | 253.0 | 2.6 | 93 | 91 | 40 | 20.0 | 80.0 | 20.0 |
|  |  | A11 | 227.1 | 2.1 | 91 | 86 | 40 | 18.0 | 95.0 | 5.0 |

TABLE 10-continued

Test results with water-based acrylic emulsion paint 2

| | | | Before dilution | | Anti-settling property (%) | | | | | |
|---|---|---|---|---|---|---|---|---|---|---|
| | | | 60 rpm | | | | | Concentration | | |
| | | | viscosity (mPa·s) | TI value | 25° C. 3 days | 25° C. 7 days | Dispersibility (μm) | of polyamide (%) | A/(A + B) (%) | B/(A + B) (%) |
| | | A12 | 228.8 | 2.2 | 90 | 89 | 40 | 18.0 | 95.0 | 5.0 |
| | | A13 | 160.4 | 1.2 | 94 | 93 | 30 | 18.0 | 64.3 | 35.7 |
| | | A14 | 182.9 | 2.4 | 88 | 82 | 40 | 18.0 | 64.3 | 35.7 |
| | | A15 | 215.4 | 2.4 | 88 | 80 | 30 | 16.5 | 70.5 | 29.5 |
| | | A16 | 210.6 | 2.7 | 98 | 95 | 40 | 18.0 | 75.0 | 25.0 |
| | | A17 | 216.7 | 2.2 | 93 | 92 | 40 | 18.0 | 85.7 | 14.3 |
| | | A18 | 219.1 | 2.2 | 93 | 86 | 30 | 27.0 | 81.8 | 18.2 |
| | | A19 | 200.0 | 2.3 | 90 | 89 | 40 | 18.0 | 75.0 | 25.0 |
| | | A20 | 190.3 | 2.1 | 93 | 93 | 40 | 18.0 | 75.0 | 25.0 |
| | | A21 | 218.1 | 2.3 | 87 | 86 | 30 | 18.0 | 75.0 | 25.0 |
| | | A22 | 226.2 | 2.4 | 90 | 80 | 30 | 18.0 | 72.0 | 28.0 |
| | | A23 | 203.8 | 2.1 | 100 | 89 | 30 | 18.0 | 75.0 | 25.0 |
| | | A24 | 243.1 | 2.3 | 100 | 95 | 30 | 18.0 | 72.0 | 28.0 |
| Formulation Comparative Examples | Anti-settling agents | H6 | 142.6 | 1.4 | 14 | 12 | 90 | 16.7 | 100.0 | 0.0 |
| | | H7 | 89.1 | 1.0 | 6 | 6 | 60 | 16.7 | 100.0 | 0.0 |
| | | H8 | 188.2 | 2.3 | 93 | 93 | 80 | 18.0 | 100.0 | 0.0 |
| | | H9 | 104.3 | 1.2 | 8 | 8 | 70 | 18.0 | 100.0 | 0.0 |
| | | H10 | 195.8 | 1.8 | 42 | 31 | 100< | 18.0 | 100.0 | 0.0 |
| | | H11 | 108.0 | 1.1 | 58 | 23 | 30 | 16.7 | 100.0 | 0.0 |
| | | H12 | 106.0 | 0.9 | 8 | 6 | 30 | 16.7 | 100.0 | 0.0 |

The invention claimed is:

1. An anti-settling agent composition for aqueous paint which comprises [A] a polyamide which has been prepared by polymerization between a diamine having 2 to 12 carbon atoms and an excess amount, relative to diamine, of either a dicarboxylic acid having 4 to 36 carbon atoms or a mixture of a dicarboxylic acid having 4 to 36 carbon atoms and a monocarboxylic acid having 2 to 22 carbon atoms, and [B] a hydrophobic organic compound which is a hydrocarbon having 10 to 54 carbon atoms which has been modified with one to three hydroxyl and/or carboxyl groups, that has either a freezing point of at most 20° C. or shows no definite freezing point,
wherein the weight ratio of the [A] polyamide to the [B] hydrophobic organic compound ranges from 95:5 to 60:40, and
wherein the [B] hydrophobic organic compound is combined with the [A] polyamide after the polymerization of the [A] polyamide.

2. The anti-settling agent composition for aqueous paint of claim 1, wherein the dicarboxylic acid in preparing the [A] polyamide is either a non-straight chain dicarboxylic acid having 36 carbon atoms or a mixture of 75 weight % or more of a non-straight chain dicarboxylic acid having 36 carbon atoms and 25 weight % or less of straight chain dicarboxylic acid having 4 to 12 carbon atoms.

3. The anti-settling agent composition for aqueous paint of claim 2, wherein the [A] polyamide has an acid value of 30 to 130 mgKOH/g.

4. The anti-settling agent composition for aqueous paint of claim 3, wherein the [B] hydrophobic organic compound comprises at least one species of compound which is selected from the group consisting of an aliphatic monoalcohol compound having 18 carbon atoms, aliphatic monocarboxylic acid compound having 10 to 18 carbon atoms, a dialcohol compound having 36 carbon atoms, a dicarboxylic acid compound having 36 to 44 carbon atoms and a tricarboxylic acid compound having 54 carbon atoms.

5. The anti-settling agent composition for aqueous paint of claim 2, wherein the [B] hydrophobic organic compound comprises at least one species of compound which is selected from the group consisting of an aliphatic monoalcohol compound having 18 carbon atoms, aliphatic monocarboxylic acid compound having 10 to 18 carbon atoms, a dialcohol compound having 36 carbon atoms, a dicarboxylic acid compound having 36 to 44 carbon atoms and a tricarboxylic acid compound having 54 carbon atoms.

6. The anti-settling agent composition for aqueous paint of claim 1, wherein the [A] polyamide has an acid value of 30 to 130 mgKOH/g.

7. The anti-settling agent composition for aqueous paint of claim 6, wherein the [B] hydrophobic organic compound comprises at least one species of compound which is selected from the group consisting of an aliphatic monoalcohol compound having 18 carbon atoms, aliphatic monocarboxylic acid compound having 10 to 18 carbon atoms, a dialcohol compound having 36 carbon atoms, a dicarboxylic acid compound having 36 to 44 carbon atoms and a tricarboxylic acid compound having 54 carbon atoms.

8. The anti-settling agent composition for aqueous paint of claim 1, wherein the [B] hydrophobic organic compound comprises at least one species of compound which is selected from the group consisting of an aliphatic monoalcohol compound having 18 carbon atoms, aliphatic monocarboxylic acid compound having 10 to 18 carbon atoms, a dialcohol compound having 36 carbon atoms, a dicarboxylic acid compound having 36 to 44 carbon atoms and a tricarboxylic acid compound having 54 carbon atoms.

9. An aqueous paint composition which comprises an anti-settling agent composition and an aqueous paint wherein the anti-settling agent composition comprises [A] a polyamide which has been prepared by polymerization between a diamine having 2 to 12 carbon atoms and an excess amount, relative to diamine, of either a dicarboxylic acid having 4 to 36 carbon atoms or a mixture of a dicarboxylic acid having 4 to 36 carbon atoms and a monocarboxylic acid having 2 to 22 carbon atoms, and [B]

a hydrophobic organic compound which is a hydrocarbon having 10 to 54 carbon atoms which has been modified with one to three hydroxyl and/or carboxyl groups, that has either a freezing point of at most 20° C. or shows no definite freezing point,
    wherein the weight ratio of the [A] polyamide to the [B] hydrophobic organic compound ranges from 95:5 to 60:40, and
    wherein the [B] hydrophobic organic compound is combined with the [A] polyamide after the polymerization of the [A] polyamide.

10. An article which has been coated with the aqueous paint composition of claim 9.

\* \* \* \* \*